United States Patent
Chern et al.

(10) Patent No.: US 7,167,322 B2
(45) Date of Patent: Jan. 23, 2007

(54) BEAM SHAPING APPARATUS

(75) Inventors: Jyh-Long Chern, Hsinchu (TW); Chia-Yu Liu, Hsinchu (TW); Hau-Wei Wang, Hsinchu (TW); Fu-Shiang Yang, Hsinchu (TW)

(73) Assignee: Industrial Technology Research Institute, Chu Tung Hsin Chu (TW)

( * ) Notice: Subject to any disclaimer, the term of this patent is extended or adjusted under 35 U.S.C. 154(b) by 0 days.

(21) Appl. No.: 11/120,727

(22) Filed: May 3, 2005

(65) Prior Publication Data

US 2006/0250703 A1    Nov. 9, 2006

(51) Int. Cl.
*G02B 3/06* (2006.01)
*G02B 13/18* (2006.01)
(52) U.S. Cl. .................. 359/710; 359/718; 359/719
(58) Field of Classification Search ................ 359/710, 359/718, 719
See application file for complete search history.

(56) References Cited

U.S. PATENT DOCUMENTS

| 4,069,080 | A | | 1/1978 | Osborne |
| 4,321,551 | A | | 3/1982 | Bleil et al. |
| 4,589,738 | A | | 5/1986 | Ozaki |
| 4,826,299 | A | | 5/1989 | Powell |
| 5,095,386 | A | * | 3/1992 | Scheibengraber ........... 359/668 |
| 5,283,694 | A | | 2/1994 | Frady |
| 5,523,889 | A | | 6/1996 | Bewsher |
| 5,629,808 | A | | 5/1997 | Powell |
| 5,973,853 | A | * | 10/1999 | Gaebe et al. ................ 359/668 |
| 6,069,748 | A | | 5/2000 | Bietry |
| 6,478,452 | B1 | | 11/2002 | Richardson et al. |
| 6,688,758 | B1 | | 2/2004 | Thibault |
| 2003/0081897 | A1 | * | 5/2003 | Itoh et al. ..................... 385/34 |

* cited by examiner

*Primary Examiner*—Jordan M. Schwartz
(74) *Attorney, Agent, or Firm*—Ingrassia, Fisher & Lorenz, P.C.

(57) ABSTRACT

A beam shaping apparatus including an optical lens is provided. The optical lens includes a diverging surface and a cylindrical surface. The diverging surface expands the input laser beam into a uniform line in one plane. The cylindrical surface converges the laser beam in another plane. Therefore, the output laser line has the desired width and the uniform density along its length.

13 Claims, 7 Drawing Sheets

BEAM SHAPING APPARATUS

FIELD OF INVENTION

The present invention relates to an apparatus, a module, and an optical lens for a line scanning technology to provide a uniformly projected beam line.

BACKGROUND OF THE INVENTION

In the spectral machine vision technology, the line scanning is provided to overcome the deficiencies of the point-scanning and the global-scanning technologies. Typically, in order to provide the line scanning capability, beam-shaping of a Gaussian laser beam into a beam line results in a Gaussian intensity distribution along the length of the projected line. U.S. Pat. No. 4,826,299 to Powell describes a single optical element which projects a laser line having uniform intensity along its length, as shown in FIG. 1. However, Powell lens 10 is designed to expand a circular beam, for example, a He—Ne laser, in a single direction to form a line. Such lens has been found to be very inefficient when used with a laser diode having an elliptical configuration, for example. In addition, Powell lens 10 is difficult to control the desired width of the projected line.

U.S. Pat. No. 5,283,694 discloses an anamorphic asphere lens that receives the non-circular beam as an input, and redistributes the non-circular input in two directions as rays which form a line of uniform width and intensity along its length and also form the line with well defined ends. However, it is quite complicated to manufacture the anamorphic asphere lens of U.S. Pat. No. 5,283,694, and the width of the beam line cannot be smaller than the diameter of the input beam.

U.S. Pat. No. 6,069,748 discloses a single lens element that controls the divergence of a diverging laser and creates a laser line at a target surface. The single element has a first surface of a toroidal shape. The first surface is concave about a center of curvature in at least one cross section and, in this cross section the laser diode is located at the center of curvature. However, the laser diode needs to be aligned with the center of curvature, and it is difficult to achieve the desired width of the laser line.

U.S. Pat. No. 6,688,758 also provides an apparatus and method for generating line patterns of laser. Wherein a diffractive optical element is positioned downstream of the anamorphic system for receiving and diffusing the first laser beam of the anamorphic system into a plurality of second laser beams. The plurality of second laser beams overlap one another at least partially so as to project a second linear pattern on the far field of altered intensity with respect to the first linear pattern. However, the additional diffractive optical element increases the cost, and it is difficult to achieve the desired width of the laser line.

Although the related art described above are useful for beam shaping, they may be improved. In particular, there is a need to achieve the desired width of the uniform laser line for the line scanning technology in a simple way. It will be advantageous that if an apparatus, a module, or an optical lens can divert the output uniform laser line in a desired direction.

SUMMARY OF THE INVENTION

The main aspect of the present invention is to provide an apparatus, a module, and an optical lens for the line scanning technology to provide a uniformly projected line.

Another aspect of the present invention is to provide an apparatus, a module, and an optical lens for the line scanning technology to provide a projected line with the desired width.

Still another aspect of the present invention is to provide an apparatus, a module, and an optical lens for the line scanning to provide a projected line output in the desired direction in a simple way.

In one embodiment, disclosed is a beam shaping apparatus including an optical lens and a source generating a laser beam. The optical lens includes a first surface and a second surface. The first surface, oriented toward the source to receive the laser beam, has an apex and being shaped to conform to a curve defined in a (x,y,z) Cartesian coordinate system by the following equation $$z = \frac{cy^2}{1 + \sqrt{(1-(1+Q)c^2y^2)}},$$

where y and z are independent of x, c is the curvature at said apex and Q is the conic constant less than (−1). The second surface, receiving the laser beam from the first surface, has a cylindrical shape and having an axial direction perpendicular to x direction.

Also disclosed is a line scanning module for a machine vision system. The line scanning module includes an optical lens and a source generating a laser beam. The optical lens includes a first surface and a second surface. The second surface has a positively cylindrical shape for receiving the uniformed laser beam transmitted from the first surface. Then the second surface converges the laser beam in a plane intersecting the (y,z) plane.

Still disclosed is an optical lens including a first surface, a second surface, and a third surface. The third surface diverts a transmitted laser beam from the first surface to the second surface or from the second surface to the first surface.

It is understandable to those skilled in the art that the first surface, the second surface, and the third surface of the optical lens of the present invention should preferably have matching optical properties.

The foregoing and other features of the invention will be apparent from the following more particular description of embodiment of the invention.

BRIEF DESCRIPTION OF THE DRAWINGS

The present invention is illustrated by way of example and not intended to be limited by the figures of the accompanying drawing, in which like notations indicate similar elements.

FIG. 2b is a (x,z) plane view of the optical lens 200 in FIG. 2a;

FIG. 2c is a (y,z) plane view of the optical lens 200 in FIG. 2a;

DETAILED DESCRIPTION

As follows, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. Benefits, other advantages, and solutions to problems have been described above with regard to specific embodiments.

Figure 1:
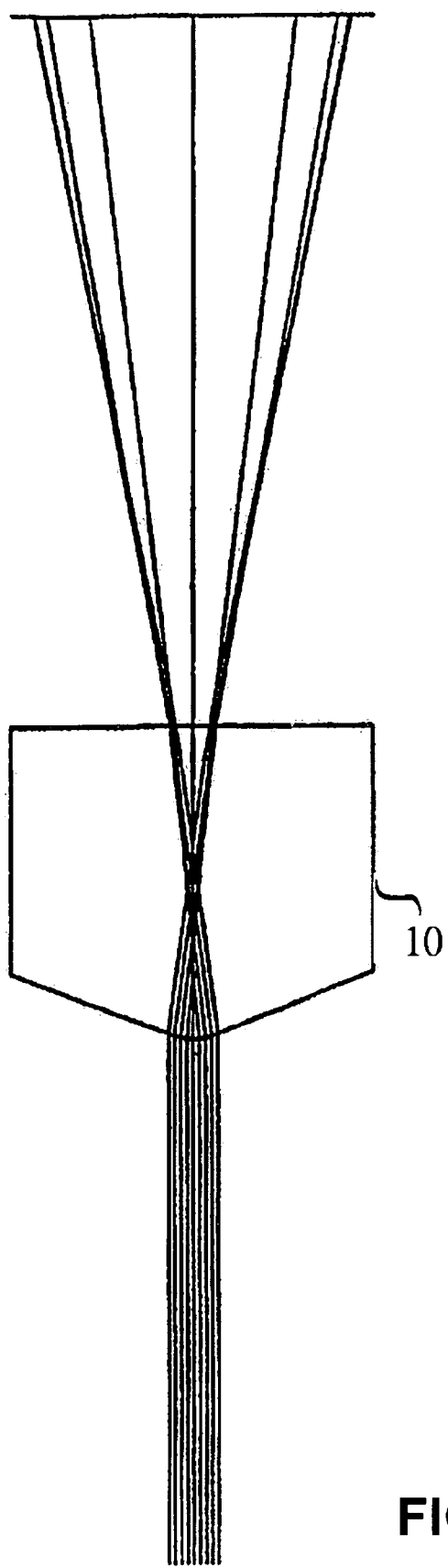
FIG. 1 is an illustration of a Powell lens 10 according to the prior art.
Figure 2A:
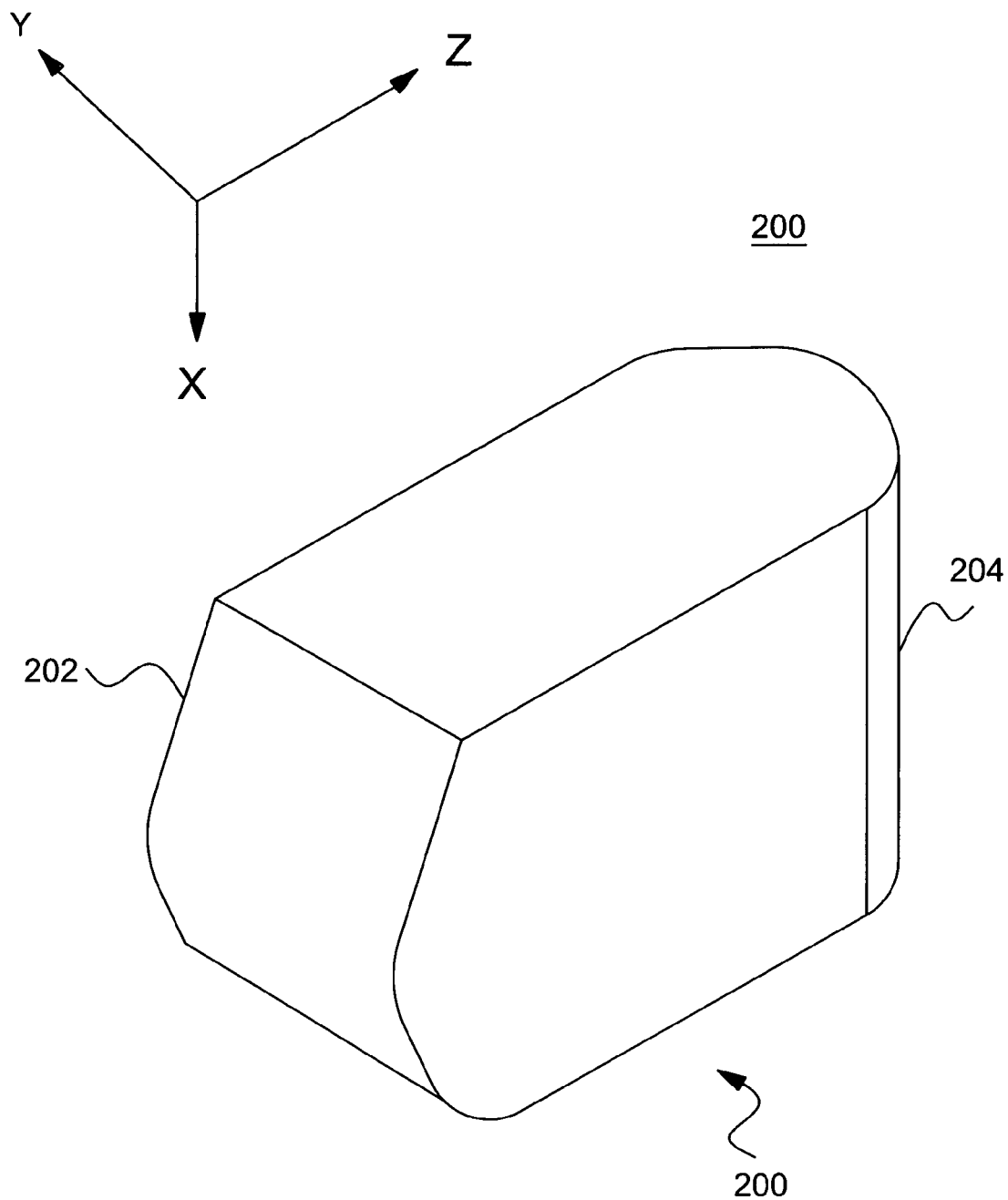
FIG. 2a is a perspective view of the optical lens 200 according to an embodiment of the present invention.
Figure 2B:
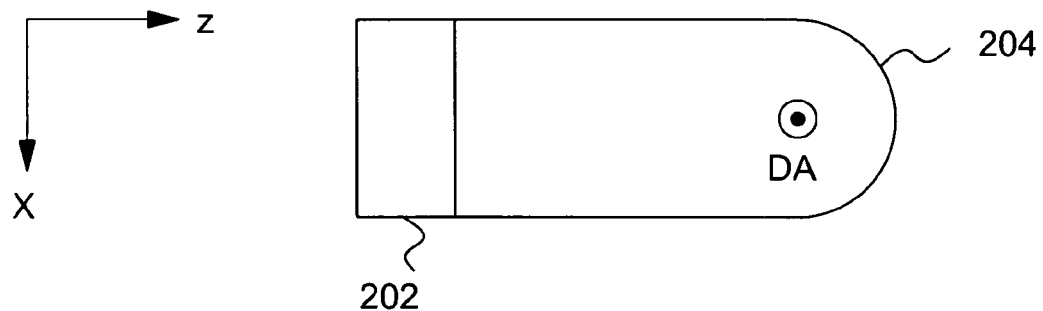
Figure 2C:
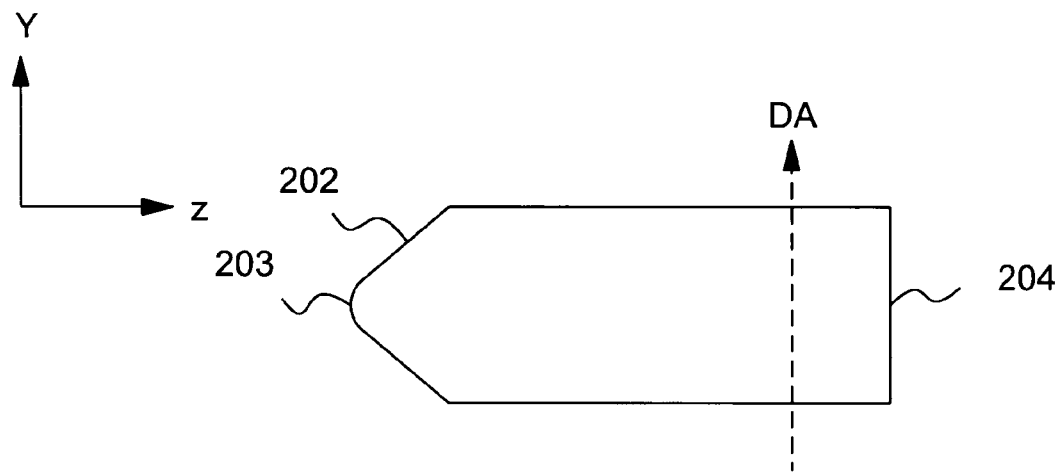

FIG. 2a illustrates the optical lens 200 in (x, y, z) Cartesian coordinate system, while FIG. 2b illustrates the optical lens 200 in (x,z) plane and FIG. 2c illustrates the optical lens 200 in (y,z) plane. The optical lens 200 has a first surface 202 and a second surface 204. Note that the optical lens 200 can be a single optical element or a combination of separate elements. Preferably, the material of the optical lens 200 is BK7 when the wavelength of the input laser beam is approximately 632 nm.

The shape of the first surface 202 spreads the energy out more at the center, but at the same time contains the energy at the edges thus producing a beam line of more uniform intensity. The shape of the first surface 202 has a small radius of curvature and a large negative conic constant. This results in the center and most intense portion of the laser beam seeing a rapidly changing surface and therefore undergoing greater divergence than that found with the less intense portion at the other periphery of the beam. As shown in FIG. 2c, the first surface 202 is two-dimensional in the (y,z) plane of (x, y, z) Cartesian coordinate system and can be described by the following equation:

$$z = \frac{cy^2}{1 + \sqrt{(1 - (1+Q)c^2 y^2)}},$$

where c is the curvature at the apex, Q is the conic constant and the first surface 202 is defined in an (x, y, z) Cartesian coordinate system. Preferably, the value of Q lies between (−4.5) and (−1.6), depending on the target position and the desired divergence angle in the (y,z) plane or the desired length of the projected line. Those skilled in the art can fully recognize the functions of the first surface 202 of the present invention with reference to the U.S. Pat. No. 4,826,299.

Figure 2D:
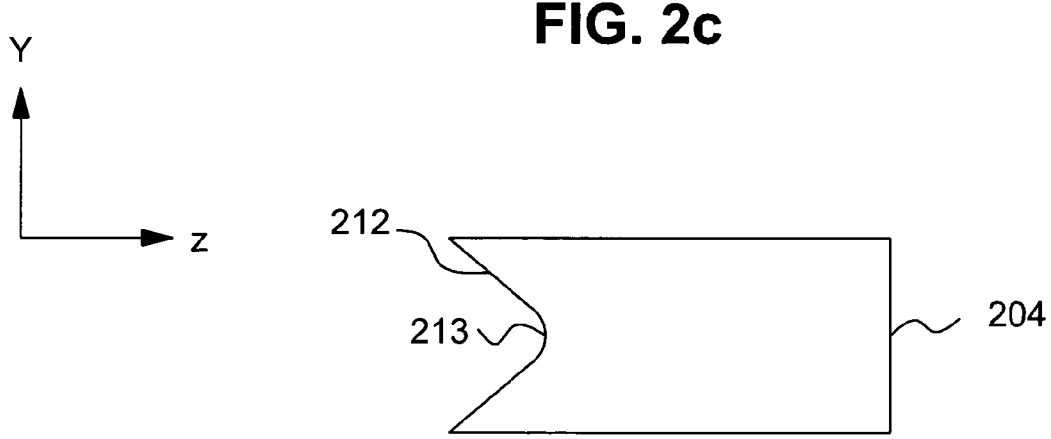
FIG. 2d is a (y,z) plane view of the optical lens 200 according to another embodiment of the present invention.

The second surface 204 is a portion of a cylindrical shape and has its axial direction (shown as DA in FIGS. 2b and 2c) perpendicular to x direction. The axial direction DA is also defined as perpendicular to any normal of the second surface 204. As shown in FIG. 2B, the second surface 204 is defined as positively cylindrical. If a laser beam is transmitted from the first surface 202 and towards the second surface 204, the positively cylindrical shape converges the transmitted laser beam. The curvature of the second surface 204 depends on the target position and the desired width of the projected line, or the desired convergence angle in the (x,z) plane. By adjusting the curvature of the second surface 204, the width of the projected line is varied and is possible to be smaller than the diameter of the input laser beam. Also as shown in FIG. 2c, the first surface 202 and the second surface 204 are furthest from each other at the apex 203. However, in another embodiment, the first surface 212 and the second surface 204 are closest from each other at the apex 213, as shown in FIG. 2d.

Figure 3A:
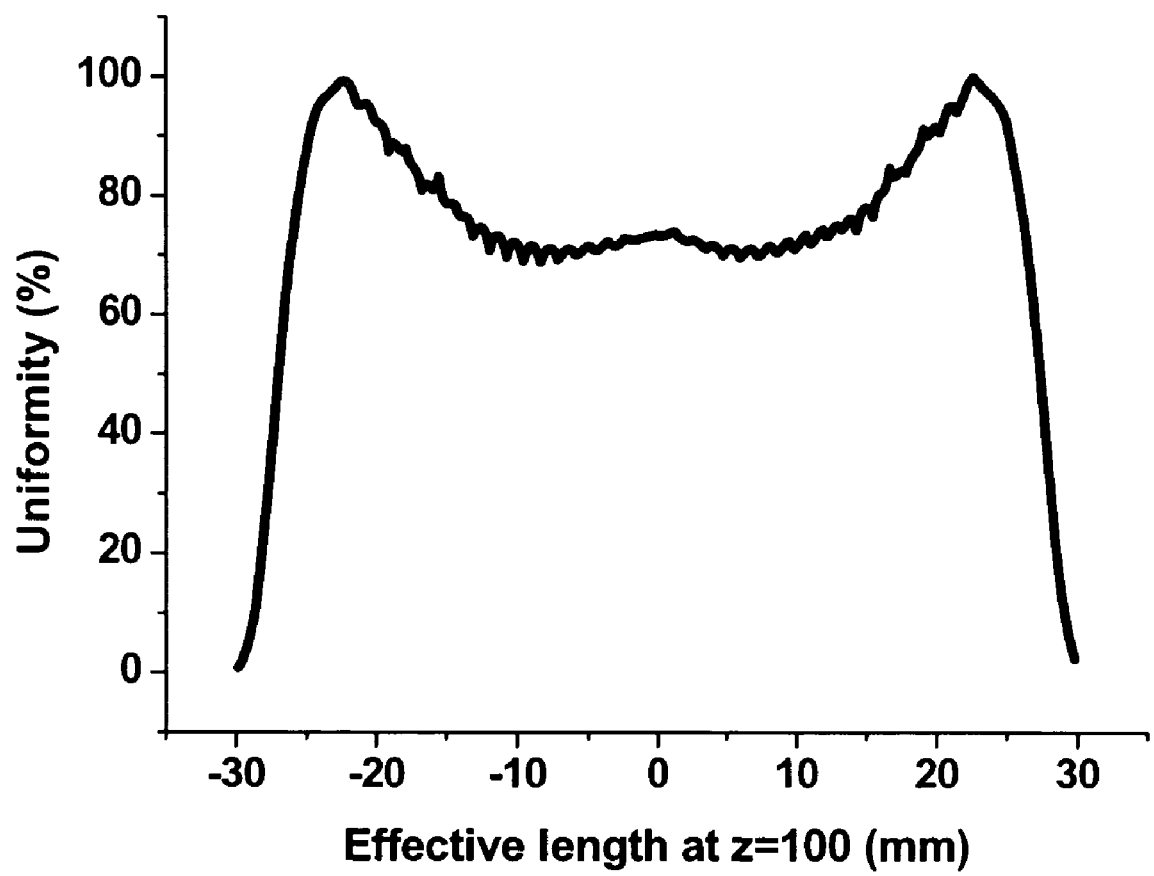
FIG. 3a illustrates the length profile achieved by optical lens 200.
Figure 4:
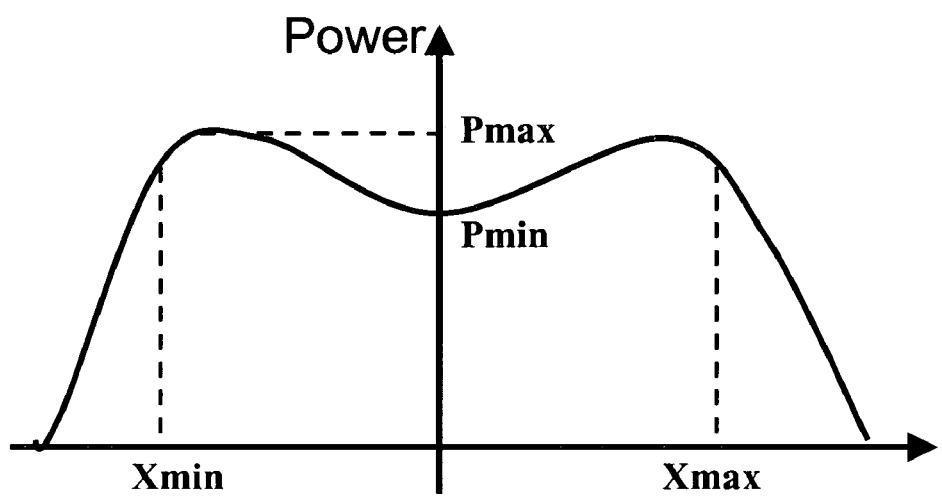
FIG. 4 explains the definition of uniformity.

An example to meet the 532 nm laser and diameter is 2.3 mm, the radius of curvature of first surface 202 is modified to 1.2 mm and conic constant is −4.0 to achieve 50.0 mm length at z=80.0 mm shown in FIG. 3a. The length profile can achieve the uniformity that is above 80% where the definition of uniformity is the minimum power divided by the maximum power within the desired range of beam profile, as shown in FIG. 4. Explicitly, uniformity can be expressed as $$U = \frac{P_{\min}}{P_{\max}}.$$

Figure 3B:
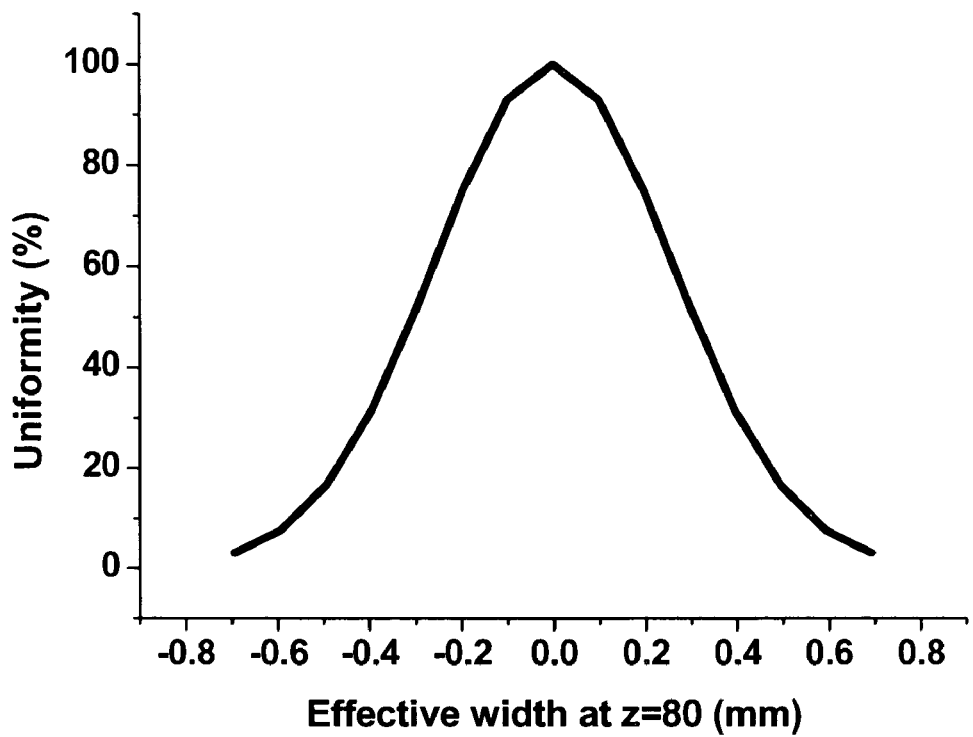
FIG. 3b illustrates the width profile achieved by optical lens 200.

The radius of curvature of second surface 204 is −27.8 to design an illuminated area that is with 0.5 mm width at z=80.0 mm which is smaller than incident beam diameter as shown in FIG. 3b. To meet the specifications, the radius of curvature of first surface 202 can be −1.2. When the incident wavelengths have to be different, the radius of curvature and conic constant can be adjusted to achieve the desired specifications.

Figure 5:
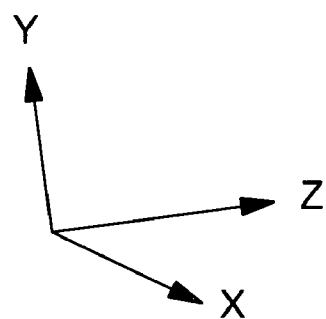
FIG. 5 is a perspective view of the optical lens 500 according to an embodiment of the present invention.
Figure 5:
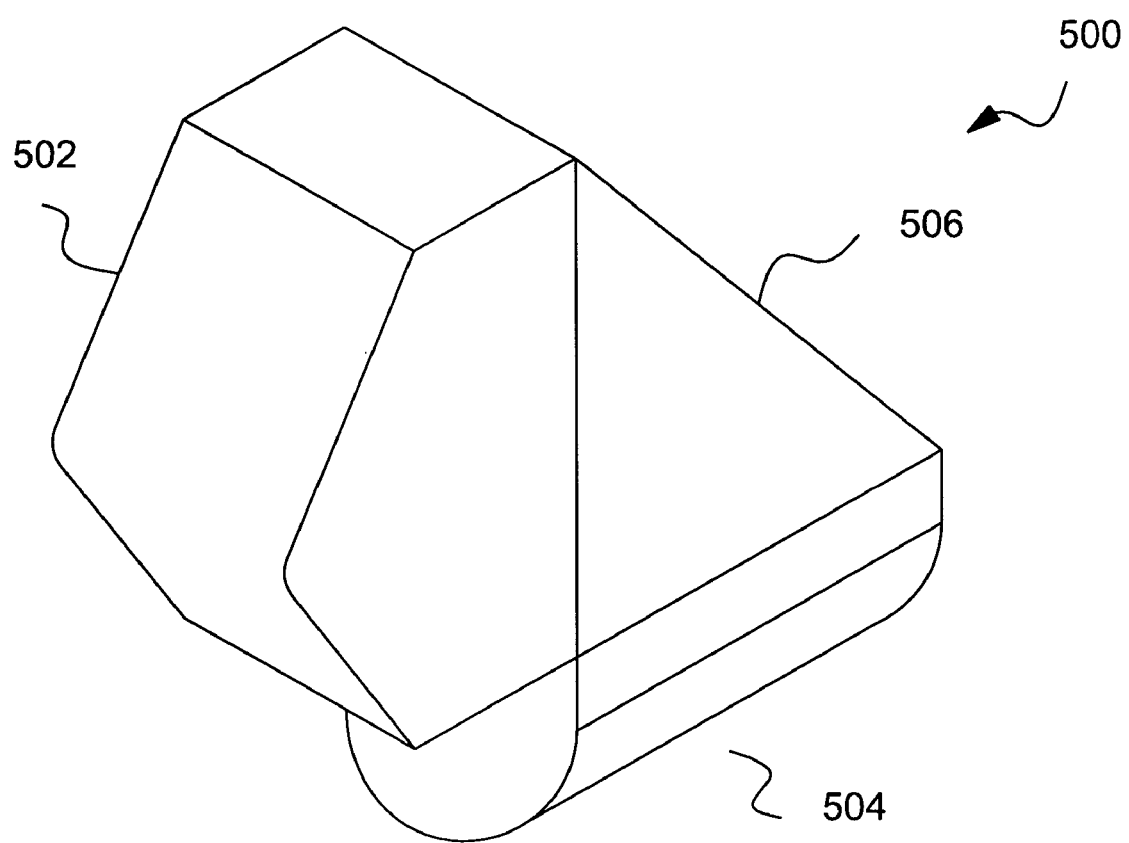

Referring to FIG. 5 of another embodiment, the optical lens 500 has a first surface 502, a second surface 504, and a third surface 506. Note that the optical lens 500 can be a single optical element or a combination of separate elements. The third surface 506 diverts a transmitted laser beam from the first surface 502 to the second surface 504, or from the second surface 504 to the first surface 502. In one embodiment, the input laser beam firstly strikes the first surface 502, and the first surface 502 uniforms the input laser beam in the (y,z) plane and directs it to the third surface 506. The third surface 506 can be, but is not limited to, a reflective flat plane for diverting the uniformed laser beam to the second surface 504. Then the second surface 504 converges the diverted beam in a plane which intersects the (y, z) plane. Therefore, the desired length, width, and output angle of the projected line are well controlled by the optical lens 500, even though the input laser beam is not a circular beam.

Figure 6:
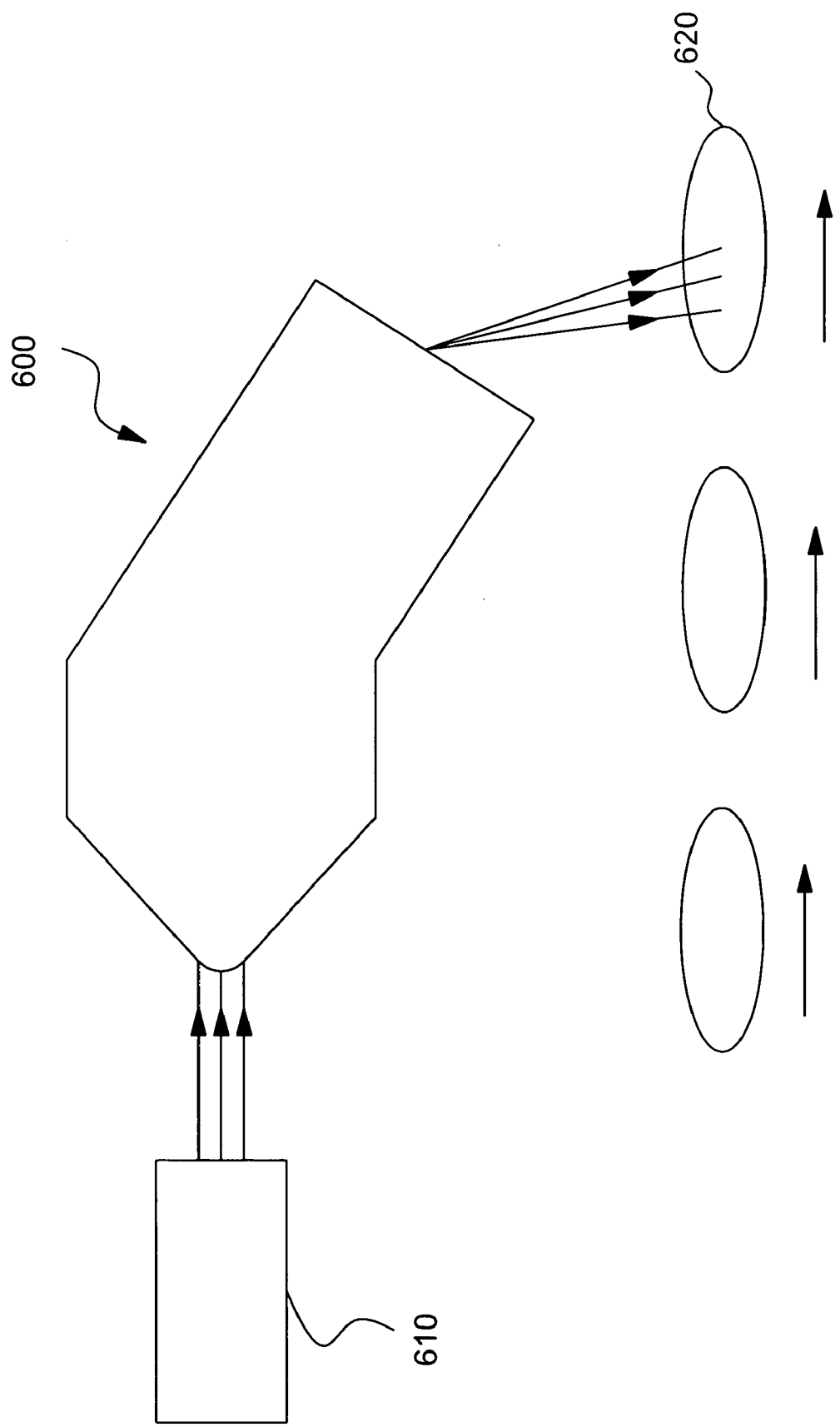
FIG. 6 illustrates an optical lens 600 for a machine vision inspection system according to an embodiment of the present invention.

It should be noted that, in addition to diverting the laser beam, the third surface 506 can have shapes other than the flat plane to, for example, converge or diverge the laser beam. And the known optical elements, such as filters, polarizers, thin films, etc., additionally attached on the third surface 506 are also covered by the scope of the present invention. Furthermore, the diverting angle of the third surface 506 depends on the target position. Referring to the optical lens 600 in FIG. 6, in practice, the laser source 610 is set up horizontally and the input laser beam is incident horizontally to the optical lens 600, and the diverting angle may be 30 or 40 degrees corresponding to the targets 620 (e.g., wafers to be inspected) which are also moving horizontally.

Those skilled in the art should appreciate the present invention may be implemented as an optical lens, a beam shaping apparatus, or, in particular, a line scanning module for a machine vision system where the length and the width of the projected line need to be well defined. While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A beam shaping apparatus, comprising:
a source generating a laser beam; and
an optical lens, comprising:
a first surface oriented toward said source to receive said laser beam, said first surface having an apex and being shaped to conform to a curve defined in a (x,y,z) cartesian coordinate system by the following equation $$z = \frac{cy^2}{1 + \sqrt{(1-(1+Q)c^2y^2)}}$$

where y and z are independent of x, c is the curvature at said apex and Q is the conic constant less than (−1); and
a second surface for receiving said laser beam from said first surface, said second surface having a positively cylindrical shape for converging said laser beam transmitted from said first surface and having an axial direction perpendicular to the x direction;
wherein the first surface is configured to adjust a length of said laser beam and the second surface is configured to adjust a width of said laser beam.

2. A beam shaping apparatus according to claim 1, wherein said first and said second surfaces are furthest from each other at said apex.

3. A beam shaping apparatus according to claim 1, wherein said first and said second surfaces are closest from each other at said apex.

4. A beam shaping apparatus according to claim 1, further comprising a surface for diverting said laser beam from said first surface to said second surface.

5. A line scanning module for a machine vision system, said line scanning module comprising:
a source generating a laser beam; and
an optical lens, comprising:
a first surface oriented toward said source to receive said laser beam, said fist surface having an apex and being shaped to conform to a curve defined in a (x,y,z) cartesian coordinate system by the following equation $$z = \frac{cy^2}{1 + \sqrt{(1-(1+Q)c^2y^2)}}$$

where y and z are independent of x, c is the curvature at said apex and Q is the conic constant less than (−1); and
a second surface having a positively cylindrical shape;
wherein said second surface receives said laser beam transmitted from said first surface and converges said laser beam in a plane intersecting a (y,z) plane;
wherein the first surface is configured to adjust a length of said laser beam and the second surface is configured to adjust a width of said laser beam.

6. A line scanning module according to claim 5, wherein said first and said second surfaces are furthest from each other at said apex.

7. A line scanning module according to claim 5, wherein said first and said second surfaces are closest from each other at said apex.

8. A line scanning module according to claim 5, further comprising a third surface for diverting said laser beam transmitted from said first surface to said second surface.

9. An optical lens, comprising:
a first surface having an apex and being shaped to conform to a curve defined in a (x,y,z) cartesian coordinate system by the following equation $$z = \frac{cy^2}{1 + \sqrt{(1-(1+Q)c^2y^2)}}$$

where y and z are independent of x, c is the curvature at said apex and Q is the conic constant less than (−1); and
a second surface, said second surface having a positively cylindrical shape for converging a laser beam; and transmitted from said first surface and having an axial direction perpendicular to the x direction;
wherein the first surface is configured to adjust a length of said laser beam and the second surface is configured to adjust a width of said laser beam.

10. An optical lens according to claim 9, wherein said first and said second surfaces are furthest from each other at said apex.

11. An optical lens according to claim 9, wherein said first and said second surfaces are closest from each other at said apex.

12. An optical lens according to claim 9, further comprising a third surface for selectively diverting a laser beam from said first surface to said second surface or from said second surface to said first surface.

13. An optical lens according to claim 9, wherein the first surface is configured to adjust a length of said laser beam and the second surface is configured to adjust a width of said laser beam.

* * * * *

UNITED STATES PATENT AND TRADEMARK OFFICE
CERTIFICATE OF CORRECTION

PATENT NO. : 7,167,322 B2 Page 1 of 1
APPLICATION NO. : 11/120727
DATED : January 23, 2007
INVENTOR(S) : Jyh-Long Chern et al.

It is certified that error appears in the above-identified patent and that said Letters Patent is hereby corrected as shown below:

In Column 5, line 50, following "comprising a", add --third--;
In Column 5, line 57, delete "fist", and add --first--.

Signed and Sealed this

Third Day of April, 2007

JON W. DUDAS
*Director of the United States Patent and Trademark Office*